Patented July 12, 1949

2,476,085

UNITED STATES PATENT OFFICE 2,476,085

PURIFICATION OF SUBTILIN

Keene P. Dimick, Redwood City, Calif., Joseph J. Stubbs, Frederick, Md., John A. Garibaldi, San Francisco, Calif., and Howard D. Lightbody and Harry L. Fevold, Chicago, Ill., assignors to the United States of America as represented by the Secretary of Agriculture No Drawing. Application October 3, 1947, Serial No. 777,843

10 Claims. (Cl. 260—236.5)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the separation of subtilin from the aqueous culture in which it has been produced, and has among its objects the obtaining of the subtilin in high yield and in a purified form.

Subtilin is an antibiotic substance which is produced by growing a particular strain of *Bacillus subtilis* in a suitable aqueous culture medium, such as asparagus juice, molasses, and so forth, according to known procedures. Separation of the produced subtilin from the aqueous culture to give suitable concentrates has been difficult.

In general, according to the present invention, the aqueous culture containing the produced subtilin is first acidified to a pH from about 1 to about 3.5. The subtilin, together with certain impurities, is then extracted from the acidified culture with an inert polar solvent, preferably butanol. The inert polar solvent extract is then mixed with a water-immiscible solvent, preferably petroleum ether, and a subtilin concentrate is extracted from the mixture thus produced with acidulated water (preferably several extractions), the acidulated water extracts containing the subtilin and certain impurities. A water-soluble inorganic salt is then added to the acidulated water extract, resulting in precipitation of a partially purified subtilin which is removed from the liquid phase in any suitable manner.

This partially purified subtilin can be applied to some uses in this form, although it is preferable to further purify or fractionate it by the following steps. The precipitate of partially purified subtilin is preferably washed several times with ethyl alcohol (90% to 100% pure) to remove alcohol-soluble impurities. The washed precipitate is then dissolved in water, the pH of the solution adjusted to about 4.6 by adding a suitable base, and a water-soluble inorganic salt in low concentration is dissolved in the solution to form a precipitate which is separated from the liquid phase. The liquid phase contains the subtilin and is retained. The precipitate may be retreated in a similar manner and the procedure repeated as many times as desired, depending on the purity of the precipitate of partially purified subtilin, to obtain a more complete isolation of the subtilin from the precipitate, the successively obtained liquid phases being combined. Finally, a water-soluble inorganic salt, in sufficient quantity to cause complete precipitation of the subtilin, is added to the liquid phase containing the subtilin, and the precipitate is removed from the liquid phase, washed and dried, to give the desired subtilin.

In the following example, which exhibits the invention in greater detail, subtilin was assayed by a short incubation period turbidimetric bacteriostatic method similar to that described by MacMahan (Jour. Biol. Chem., vol. 153, p. 249, 1944) for penicillin. Test organisms included *Micrococcus conglomeratus*, *Staphylococcus aureus*, and *Streptococcus faecalis*. The values of subtilin contents are relative and based on a selected sample of partially purified subtilin, the potency of which was arbitrarily designated as 100%. Thus a reference to a subtilin content of 68 equivalent grams means that the sample, irrespective of its weight contains an amount of active material equivalent to 68 grams of the standard material. Since the products produced according to this invention are purer than the arbitrary standard, the equivalent subtilin content of many samples is greater than the actual weight of the material obtained. In such cases the relative potency will naturally be above 100%.

EXAMPLE

(a) Butanol extraction 150 liters of a culture obtained by the growth of *Bacillus subtilis* under submerged conditions was adjusted to a pH of 2.5 by the addition of hydrochloric acid. 75 liters of normal butanol (polar solvent) was added to the acidified culture, the mixture thoroughly agitated and then centrifuged. The butanol phase obtained as a supernatant liquid had a volume of 65.5 liters, a solids content of 655 grams of which 68 equivalent grams was subtilin, i. e., a relative potency of 10.3%.

(b) Acidulated water extraction 32.8 liters of petroleum ether (water-immiscible solvent) was added to the butanol phase and the resulting mixture was extracted three times with 1% aqueous acetic acid (acidulated water) using about 22 liters of the aqueous acetic acid in each extraction. After each extraction, the aqueous phases were separated from the water-immiscible solvent. These aqueous phases were then combined and had a volume of 36.6 liters, a solids content of 440 grams of which 58 equivalent grams was subtilin, i. e., a relative potency of 13.2%.

(c) Precipitation from aqueous phase

Sufficient sodium chloride was added to the combined aqueous phases to establish a concentration of 6% of the sodium chloride. The crude subtilin which precipitated was separated by filtration. This precipitate had a solids content of 50.3 grams and a subtilin content of 69 equivalent grams, i. e., a relative potency of 139%.

(d) Alcohol washing of subtilin precipitate

The precipitate thus obtained was washed several times with 95% alcohol. The residual solid material had a solids content of 35.8 grams, and a subtilin content of 49.8 equivalent grams, i. e., a relative potency of 139%.

(e) Fractionation of subtilin precipitate

The washed precipitate was dissolved in sufficient water to form a 1% solution. This solution was adjusted to a pH of 4.6 by the addition of sodium hydroxide. Sufficient sodium chloride was added to give a concentration of 0.4% of the salt. The material which precipitated was filtered off and redissolved in water at the same concentration as set forth above. Sodium hydroxide and sodium chloride were also added as above described. The precipitate obtained was treated again in the same manner. The precipitate obtained in the third fractionation was discarded. The aqueous phases were combined and represented a volume of 9.43 liters and a solids content of 23.5 grams.

(f) Final precipitation of subtilin

Sufficient sodium chloride was added to the combined aqueous phases thus obtained to establish a concentration of 10% of the salt. The subtilin which precipitated out of solution was filtered off, washed with water (adjusted to pH 7.5 by addition of sodium hydroxide) and dried by lyophilization (i. e., dried in vacuum while in the frozen state). Twenty-one grams of product was obtained which had a subtilin content of 30.5 equivalent grams, i. e., a relative potency of 145%.

In part (a) of the above example, it is preferable to use hydrochloric acid as the acidifying agent, although other mineral acids such as sulphuric, hydrobromic, etc., may be employed, and the pH may be varied from about 1 to about 3.5. Although normal butanol is the preferred polar solvent, other solvents may be used, for instance isobutyl alcohol, methyl ethyl ketone, normal amyl alcohol, isoamyl alcohol, etc. In general, polar solvents which are soluble to an extent of about 5% to about 20% in water and which have a reciprocal solubility (polar solvent in water) of the same range are suitable. The amount of polar solvent may be varied over wide limits. One-half volume of polar solvent per volume of culture is about the minimum, and it is expedient to use the minimum amount in order to decrease the quantity of liquid to be handled in subsequent operations.

In part (b) of the example is illustrated the preferred method of separating a subtilin concentrate, i. e., by adding a water-immiscible solvent. Other techniques for accomplishing this separation will be discussed below. In the preferred modification, many water-immiscible solvents may be substituted for the petroleum ether. Thus one may employ chloroform, carbon tetrachloride, ethyl ether, toluene, benzene, or aliphatic hydrocarbons such as pentane, hexane, or mixtures of them such as gasoline, naphtha, benzine, etc. The amount of water-immiscible solvent may be varied over wide limits, but it is expedient to keep it to a minimum of about one-half volume of the solvent per volume of polar solvent extract. In this technique, addition of the water-immiscible solvent causes a phase separation, i. e., formation of (1) a polar solvent and water-immiscible solvent phase and (2) a water and subtilin concentrate phase. Generally, the entire mixture is extracted with the acidulated water, since some subtilin is present in phase (1) although such technique is not essential and one can extract only the subtilin concentrate phase.

Other expedients for separating a subtilin concentrate from the polar solvent extract involve salting-out or distillation techniques. In the former case, the polar solvent extract is saturated with a water-soluble inorganic salt such as sodium chloride, potassium chloride, magnesium chloride, magnesium sulphate, sodium sulphate, potassium sulphate, ammonium chloride, ammonium sulphate, etc. In such operation three phases are obtained—a solvent phase, a phase of water saturated with inorganic salt and a subtilin concentrate phase. The latter may be extracted with acidulated water as shown in the example for subsequent purification.

In the distillation method for separating the subtilin concentrate, the polar solvent extract is concentrated in vacuum to about one-tenth of its volume adding water continuously to keep the polar solvent saturated with water and distilling as a binary and finally allowing the solvent to become dry by evaporation of the water. When most of the water is removed the subtilin will precipitate out after which it can be separated and subjected to the extraction with acidulated water for further purification.

Regardless of how the subtilin concentrate is separated, the next step involves extraction thereof with water which has been adjusted to a pH of about 1 to about 3.5 by the addition of an acid such as sulphuric, hydrochloric, hydrobromic, etc. It is preferred, however, to use a 1% solution of acetic acid which has, intrinsically, a pH of 3.5

The partially purified subtilin produced in step (c) may be used for some purposes, for instance, in topical applications. For applications requiring intravenous injection it is preferable to further purify the material as set forth in the example.

In parts (c), (e) and (f), any water-soluble inorganic salt, such as potassium chloride, magnesium chloride, ammonium chloride, ammonium sulphate, magnesium sulfate, sodium sulfate, potassium sulfate, and so forth, may be used in lieu of the sodium chloride to effect the precipitation. Sodium chloride is preferred, the amount added to the aqueous extract in parts (c) and (f) generally being such as to give a salt concentration from about 6% to about 10%.

In part (e), the amount of water used to dissolve the washed precipitate may be varied, the 1% solution of the example being preferred. About from 0.5% to 2.0% solutions are also satisfactory.

In parts (e) and (f), any of the usual bases, such as alkali metal hydroxides, ammonium hydroxide, and so forth, may be used to adjust the pH of the water solution to the desired pH, sodium hydroxide being preferred.

In part (f), the final washing of the subtilin may be carried out in several different ways. The precipitated subtilin may be washed with water until the wash water contains about 1% salt, then washed with absolute alcohol to remove the remaining salt. The precipitate may also be washed with water which is made alkaline by addition of an alkali metal hydroxide or ammonium hydroxide. The pH of the alkaline wash water should be from about 6.5 to about 9 to prevent solution of the subtilin.

The subtilin obtained according to this invention is a dull white powder soluble in acidified water, the active factor being concentrated 200 to 300 times (dry weight basis) that of the culture medium.

Having thus described our invention, we claim:

1. A process of separating subtilin from a culture containing the same comprising acidifying the culture to a pH from about 1 to about 3.5, extracting a subtilin concentrate from the acidified culture with an inert organic polar solvent having a solubility from about 5% to about 20% in water, mixing the polar solvent extract with a water-immiscible solvent, extracting a subtilin concentrate from the mixture thus produced with acidulated water, and adding a water-soluble inorganic salt to the acidulated water extract to precipitate a partially purified subtilin.

2. A process according to claim 1 wherein the acidulated water has a pH from about 1 to about 3.5.

3. A process according to claim 1 wherein the the polar solvent is butanol.

4. A process according to claim 3 wherein the water-immiscible solvent is petroleum ether.

5. A process of separating subtilin from a culture containing the same comprising acidifying the culture to a pH from about 1 to about 3.5, extracting a subtilin concentrate from the acidified culture with an inert organic polar solvent having a solubility from about 5% to about 20% in water, mixing the polar solvent extract with a water-immiscible solvent, extracting a subtilin concentrate from the mixture thus produced with acidulated water, adding a water-soluble inorganic salt to the acidulated water extract to precipitate partially purified subtilin, fractionating the precipitate in aqueous solution at a pH of about 4.6 containing about 0.4% of a water-soluble inorganic salt, and precipitating the subtilin from said aqueous solution by adding further amounts of water-soluble inorganic salt.

6. A process according to claim 5 wherein the organic polar solvent is butanol.

7. A process according to claim 6 wherein the water-immiscible solvent is petroleum ether.

8. A process of separating subtilin from a culture in which it has been produced comprising acidifying the culture with a mineral acid to a pH from about 1 to about 3.5, extracting the subtilin therefrom with butanol, mixing the butanol extract with a water-immiscible solvent, extracting a subtilin concentrate from the mixture thus produced with water acidulated to a pH from about 1 to about 3.5, adding a water-soluble inorganic salt to the aqueous extract to precipitate a partially purified subtilin, removing the precipitate and dissolving it in water, adding a base to the solution to adjust the pH to about 4.6, adding a water-soluble inorganic salt to the solution to give a salt concentration of about 0.4%, removing the precipitate thus formed, adding a water-soluble inorganic salt to the remaining aqueous phase to precipitate substantially all the subtilin contained therein, and removing the precipitated subtilin.

9. A process according to claim 8 wherein the precipitate of partially purified subtilin is washed with alcohol before it is dissolved in the water.

10. A process according to claim 8 wherein the acid used to make adjustment of the pH is hydrochloric acid, the water-soluble inorganic salt used is sodium chloride, and the base used to make adjustment of the pH is sodium hydroxide.

KEENE P. DIMICK.
JOSEPH J. STUBBS.
JOHN A. GARIBALDI.
HOWARD D. LIGHTBODY.
HARRY L. FEVOLD.

REFERENCES CITED

The following references are of record in the file of this patent:

Jansen et al., Arch. Biochem., vol. 4, pp. 297–309 (1944).